(12) United States Patent
Benestad et al.

(10) Patent No.: US 7,718,899 B2
(45) Date of Patent: *May 18, 2010

(54) HIGH PRESSURE, HIGH VOLTAGE PENETRATOR ASSEMBLY FOR SUBSEA USE

(76) Inventors: Harald Benestad, Reahagen 34, Oslo (NO) NO-0754; Pål Georg Benestad, Bjørnerudveien 21, Drammen (NO) NO-3039

( * ) Notice: Subject to any disclaimer, the term of this patent is extended or adjusted under 35 U.S.C. 154(b) by 381 days.

This patent is subject to a terminal disclaimer.

(21) Appl. No.: 11/928,430

(22) Filed: Oct. 30, 2007

(65) Prior Publication Data

US 2008/0314616 A1    Dec. 25, 2008

(30) Foreign Application Priority Data

Jun. 25, 2007    (NO) .................................. 20073266

(51) Int. Cl.
*H01B 17/26*    (2006.01)
(52) U.S. Cl. ................ 174/152 R; 174/70 S; 174/88 C; 439/199; 385/138
(58) Field of Classification Search ............. 174/152 R, 174/70 S, 88 C, 75 C, 360; 439/199, 201; 385/138
See application file for complete search history.

(56) References Cited

U.S. PATENT DOCUMENTS

| 4,103,104 | A | * | 7/1978 | Spollen ..................... 174/70 S |
| 5,772,457 | A | * | 6/1998 | Cairns ........................ 439/201 |
| 6,017,227 | A | * | 1/2000 | Cairns et al. ................ 439/138 |
| 6,067,395 | A | * | 5/2000 | Cairns et al. ................ 385/138 |
| 6,364,677 | B1 | * | 4/2002 | Nysveen et al. ............. 439/199 |
| 7,526,175 | B2 | * | 4/2009 | Sumitani .................... 385/138 |

FOREIGN PATENT DOCUMENTS

| WO | WO03033867 A2 | 4/2003 |
| WO | WO2004055950 A1 | 7/2004 |

* cited by examiner

*Primary Examiner*—Dhiru R Patel
(74) *Attorney, Agent, or Firm*—Rodman & Rodman

(57) ABSTRACT

The invention relates to a high pressure, high voltage penetrator assembly for subsea use, wherein the assembly is upright attachable to a wet gas, subsea gas compressor, and wherein the assembly includes a penetrator unit for feed-through of electric power to a compressor motor; a funnel shaped housing with a housing chamber, the penetrator unit being located at an upper end of the chamber; a grid located inside the chamber transversely of a longitudinal axis of the chamber, the penetrator unit being located above the grid, a filter located in the chamber below the grid and above an inlet to a housing of the compressor motor, and a sensor unit extending into the chamber from the penetrator unit and towards, but spaced from the grid.

9 Claims, 3 Drawing Sheets

HIGH PRESSURE, HIGH VOLTAGE PENETRATOR ASSEMBLY FOR SUBSEA USE

CROSS REFERENCE TO RELATED APPLICATIONS (Not Applicable)

STATEMENT REGARDING FEDERALLY SPONSORED RESEARCH OR DEVELOPMENT (Not Applicable)

NAMES OF THE PARTIES TO A JOINT RESEARCH AGREEMENT (Not Applicable)

INCORPORATION BY REFERENCE OF MATERIALS SUBMITTED ON A COMPACT DISC (Not Applicable)

The present invention relates to a high pressure, high voltage penetrator assembly for subsea use, as defined in the preamble of attached claim 1. Further, the invention relates to a high voltage penetrator for use in a penetrator unit of the assembly, as defined in the preamble of claim 7.

BACKGROUND OF THE INVENTION

In order to stabilize and increase hydrocarbon process gas (wet gas) delivery from a production well, whether subsea or topside, a compressor is usually installed downstream of a coarse liquid separation, The compressor requires a drive motor with a high power rating, usually in a current range of 500-2000 A and a voltage range of 6.6-12 kVAC.

It is important to cool the motor, an in doing so the process gas obtained from the production well is used as a cooling medium. In turn, this implies that the power cables to the motor as well as the penetrator assembly will be exposed to a wet gas environment at high temperatures, typically in the range of 70° C.-200° C. and at a high pressure in the range of 100-400 bar.

The gas which is used for cooling the motor is both wet, as it may contain water, and polluted, as it normally will contain electrically conductive particles and a large variety of other impurities which may lead to electrical flash-over, creep currents and voltage breakdown. In a worst scenario, such operating conditions may lead to ignition of the production gas and explosion, with catastrophic consequences.

Further, during a wet gas production, a rapid decompression may occur, and as a result devices such as O-rings and electrical insulation which have been exposed to high pressure, may simply explode, giving rise to the risk of fatal breakdown of the compressor subsea installation.

In view of on one hand to require optimum withdrawal of gas from a production well and therefore the need to increase the pressure therein to expel the gas from the reservoir, and on the other hand the tough and hazardous environment in which a subsea compressor unit has to work, with related implications if an operation failure is about to happen and is not detected in time to take counter-measures to prevent it happen, has been a headache to the profession and a challenge which has existed for years without a satisfactory solution to overcome the well known operational problems.

It has therefore been a the prime object of the present invention to provide a technical solution which will remedy the deficiencies of the prior art solutions or at least reduce the operational hazards to an absolute minimum, thereby gaining operational stability, longer life of the compressor and its motor, and in turn improved cost-benefit rating.

BRIEF SUMMARY OF THE INVENTION

According to the invention, the high pressure, high voltage penetrator assembly for subsea use, as mentioned in the introductory section, is characterized in:

that the assembly is upright attachable to a wet gas, subsea gas compressor, and that the assembly comprises:
  a penetrator unit for feed-through of electric power to a compressor motor;
  a funnel shaped housing with a housing chamber, the penetrator unit being located at an upper end of the chamber;
  a grid located inside the chamber transversely of a longitudinal axis of the chamber, the penetrator unit being located above the grid,
  a filter located in the chamber below the grid and above an inlet to a housing of the compressor motor, and
  a sensor unit extending into the chamber from the penetrator unit and towards, but spaced from the grid.

According to further embodiments of the penetrator assembly, the grid has a mid-region thereof which is non-penetratable to liquid or gas. Electric cables from the sea surface extend down to the penetrator and are attached thereat to lead-through pins in the penetrator unit and which extend into the chamber and thereat are connected to electric cables for delivering power to the compressor motor. The electric power cables extend inside the chamber from the penetrator unit through the grid and the filter and into the motor housing to be connected to electric terminals on the compressor motor.

Suitably, the filter is composed of ceramic pellets, beads or spheres, although other materials may be suitable.

According to another embodiment of the penetrator assembly, the sensor unit is configured to operate in cooperation with signal processing means external of the assembly, the sensor unit having means for monitoring properties of an environment inside the housing, said means being at least one of: a pressure sensor, a temperature sensor, a liquid gas level sensor, and a sensor for sensing type or types of liquid inside the chamber. Suitably, but not necessarily, the sensor unit comprises all four types of sensors. Although the sensors may be located on the penetrator unit on individual support, it is according to a preferred embodiment that the applied sensors are all located on a common carrier device which extends into the chamber in the space between the penetrator unit and the grid.

Further, in order to accomplish a safe operation of the assembly, it is important that each high voltage penetrator in the penetrator unit is able to handle the operational electrical values in practice, as well as the temperature and pressure conditions.

According to the invention, each penetrator comprises:
  a cable inlet terminal and a cable outlet terminal, a conductive pin at either end forming and extending between the terminals and engageable at said either end with an inlet cable and an outlet cable, respectively in a close engaging fit,
  a ceramic sleeve surrounding the terminals and an adjacent part of the conductive pin and the cable thereat, insulating means which surround at least a substantial length of the conductive pin, wherein said insulating means comprise:
  a bootseal housing with silicone oil or gel therein encompassing the inlet terminal,
  a ceramic deflector, and
  an insulator pressure barrier of glass, ceramic or glass-ceramic material,
  a penetrator attachment sleeve in engagement with the bootseal housing,
  a cable gland device installed on the penetrator attachment sleeve and extending towards the inlet side of the penetrator, the cable gland device providing an internal space adjacent an inlet side of the bootseal housing, said internal space being filled with a silicone oil or gel, and
  a metal body in engagement with the penetrator attachment sleeve, said bootseal housing and the pressure barrier, the metal body surrounding at least a part of said ceramic deflector and said insulator pressure barrier.

According an embodiment of the penetrator, said metal body is made from titanium, Further, in order to obtain maximum electric creep distance, at least a part of the metal body is provided on an inside face with glass or ceramic or glass-ceramic material, said material engaging at least a part of the ceramic deflector and the metal body having a flared configuration part facing the outlet terminal of the penetrator.

BRIEF DESCRIPTION OF THE DRAWINGS

The invention is now to be further described with reference to the attached drawings showing non-limitative embodiments of the invention.

DETAILED DESCRIPTION OF THE INVENTION

Figure 1:
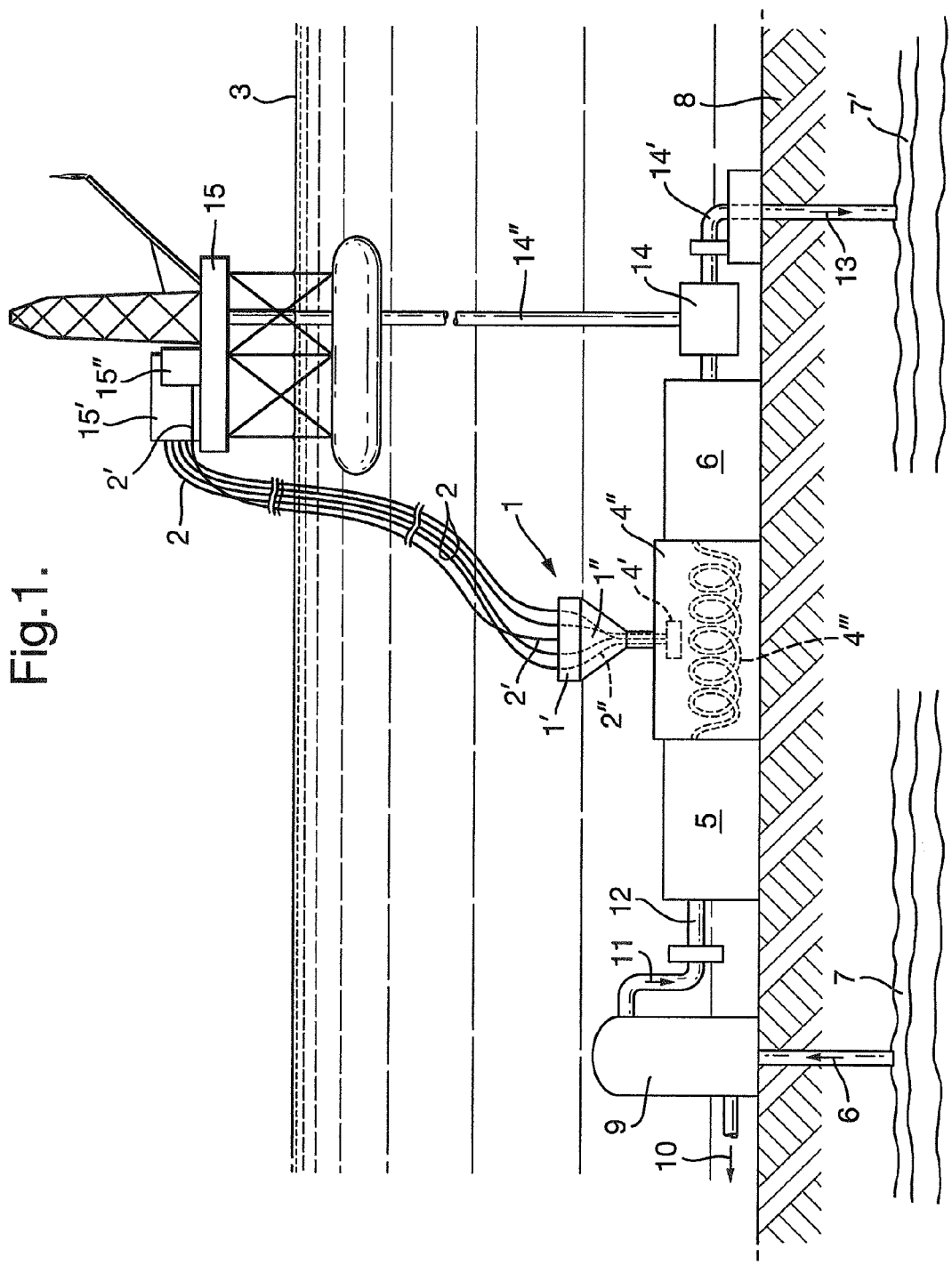
FIG. 1 is a simplified sketch showing an operational environment of the assembly and the penetrator of the invention.

FIG. 1 shows a typical working environment of the penetrator assembly 1 with power cables 2 and signal cables 2' extending down from a surface 3' of a sea 3 and the power cables 2 powered by a generator 15' on an offshore installation, e.g. an offshore platform 15 (for simplicity not shown to scale relative to a compressor unit 4, 5, 6 on the sea bed 8). The signal cables 2' lead to a signal processing station 15'' on the installation 15. The power cables 2 are relayed through the penetrator unit 1' of the assembly 1, and further power cables 2'' extend from the penetrator unit 1' through the inside 1'' of the assembly down into motor connection terminals 4' inside a housing 4'' of a motor 4 which is configured to drive an upstream installed wet gas compressor 5 and a downstream wet gas compressor 6.

The compressor receives gas 6 from a reservoir 7 below the seabed 8, and the gas passes through a separator 9 which delivers a gas condensate 10 and passes gas 11 which is still characterized as somewhat wet gas through as pipeline 12 into the first compressor 5. From the compressor 5, the compressed gas passes through cooling passages 4''' in the motor 4 and then further on and through the second compressor 6, and therefrom as pressurized gas 13 back to the reservoir 7' via e.g. two-way valve 14 and a pipeline 14'. Whenever the pressure in the reservoir has been sufficiently increased, the valve 14 can be remotely controlled from the installation 15 to switch output flow from the compressor 6 to be directed instead towards the surface via a pipeline 14''. Under certain circumstances the pressure in the reservoir may be sufficiently high in order that a direct pipeline down into the reservoir may suffice.

As indicated in the introductory part, the motor 4 is a high power motor, and therefore it is required that the penetrator assembly must be able to withstand the high current and voltage ratings involved, as well as the high temperature and pressure values, and further be able to give alert if operational hazards are imminent and should require immediate shut-down of the compressor unit 4, 5, 6.

The penetrator assembly is now to be further described with reference to FIGS. 2 and 3.

As shown on FIG. 1, it is important that the penetrator assembly 1 is positioned upright when attached to the motor housing 4'' of the wet gas, subsea gas compressor unit 4, 5, 6.

Figure 2:
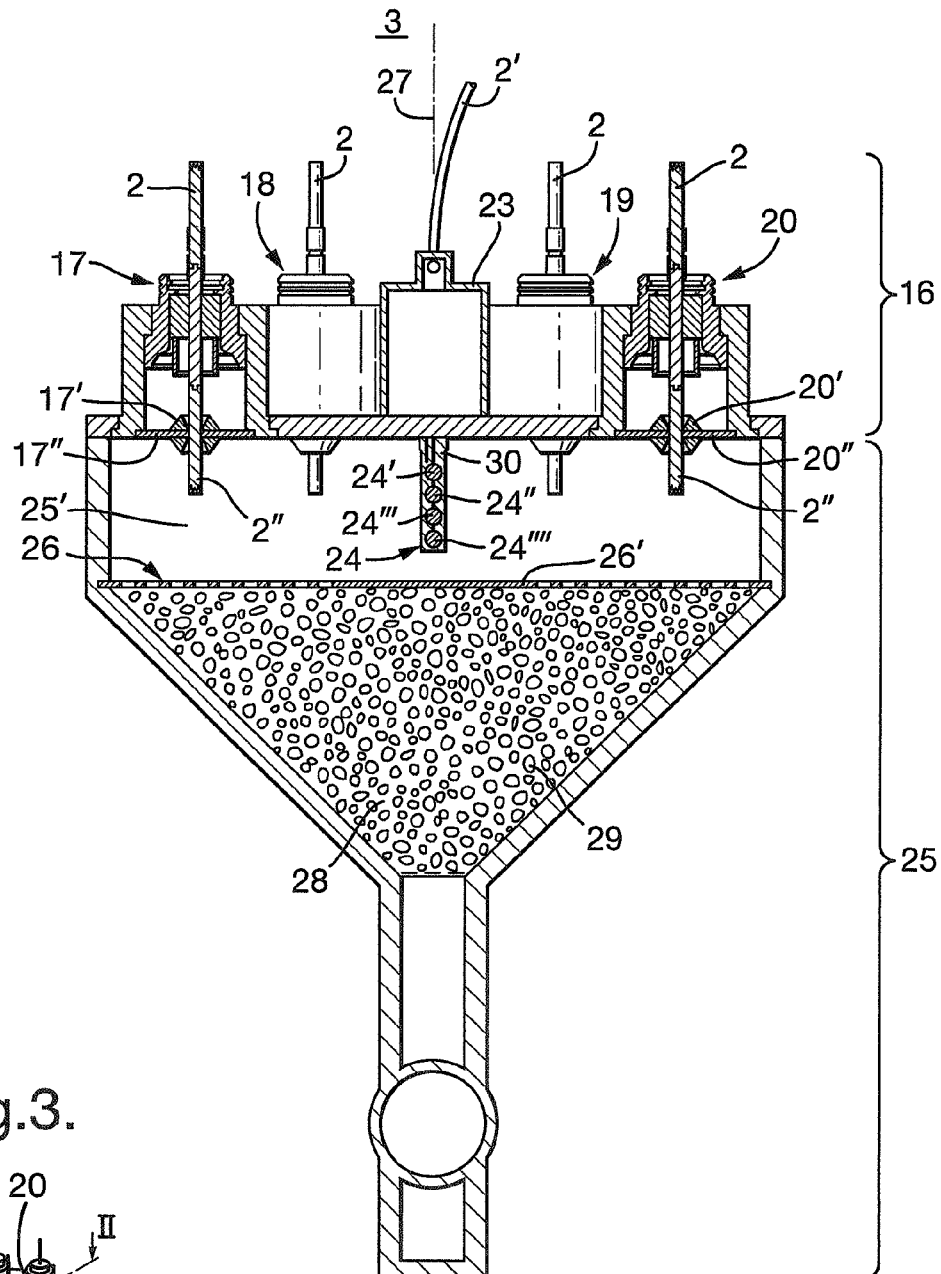
FIG. 2 is a vertical cross-section II-II as seen on FIG. 3 through the penetrator assembly of the invention.
Figure 3:
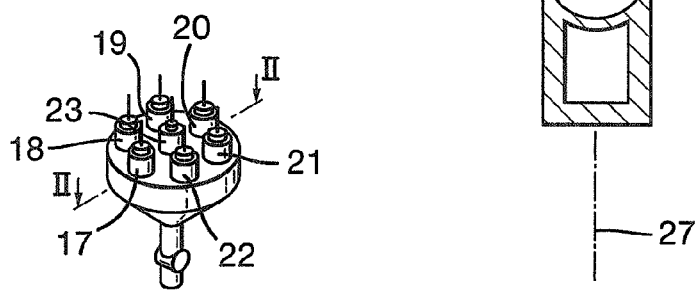
FIG. 3 is a perspective view from above of the penetrator assembly of the invention.

As seen on FIGS. 2 and 3, the that the assembly comprises a penetrator unit 16 for feed-through of electric power to a compressor motor 4, the unit 16 having in the particular, non-limitative example embodiment a total of six power supply penetrators 17-22 and a penetrator 23 linked to a sensor unit 24. The penetrators 17-22 have suitably each a cable support and holder, as indicated at 17' and 22', attached 70 ceramic support plate 17''; 20'', respectively. The sensor unit 24 is linked to the signal processing means 15'' onboard the installation 15. The operation of the sensor unit is to be explained in further detail later, Further, the penetrator assembly has a funnel shaped housing 25 with a housing chamber 25', and it is noted that the penetrator unit 16 is located at an upper end of the chamber 25'.

A grid 26 is located inside the chamber transversely of a longitudinal axis 27 of the chamber, and it is noted that the penetrator unit 16 is located above the grid 26. The grid has preferably a mid-region 26' thereof which is non-penetratable to liquid or gas, i.e. having no perforations thereat. The purpose of the mid region is to obtain better flow properties inside the chamber 25' and not direct flow towards the sensor 24 from below.

A filter 28 is located in the chamber 25' below the grid and above an inlet to a housing 4'' of the compressor motor 4. The filter 28 is suitably constituted by a volume of ceramic pellets, beads, tubes or spheres, although other materials and shapes thereof may equally well be suitable if operating in a substantially technically equivalent manner.

As indicated above, the penetrator assembly also comprises the sensor unit 25 which extends into the chamber 25' from the penetrator unit 16 and towards, but spaced from the grid 26, as clearly seen on FIG. 2. The sensor unit 24 is configured to operate in cooperation with said signal processing means 15'' external of the assembly via one or more signal cables 2'. The sensor unit has suitably means for monitoring properties of an environment 29 inside the housing 25, and said means are suitably at least one of: a pressure sensor 24', a temperature sensor 24'', a liquid gas level sensor 24''', and a sensor 24'''' for sensing type or types of liquid inside the chamber. Suitably, but not necessarily, the sensor unit comprises all four types of sensors. Although the sensors may be located on the penetrator unit on an individual support (not shown), it is according to a preferred embodiment that the applied sensors are all located on a common carrier device 30 which extends into the chamber 25' in a space between the penetrator unit 16 and the grid 26.

The penetrator unit 16 with its penetrators 17-23 are, as noted from FIG. 1 mounted on top of the chamber 25', thus sealing of the chamber 25' thereat. The penetrators of the unit 16 are directly cooled by the sea water 3. The motor as well as the compressors are of course also to a certain extent cooled by the surrounding sea water, as is also the housing 25 and thereby its interior 25'.

Sealing O-rings 45 and C-ring 46 are provided. The references numerals 47 and 48 indicate the cable insulation on the inlet cable 2 and the outlet cable 2".

It is quite important that the penetrator assembly is mounted so that the unit 16 and the funnel shaped housing 25 will have its longitudinal axis 27 substantially upright, preferably vertical if possible. Therefore care should be made to have the compressor unit 4, 5, 6 properly placed on the sea bed 8 to make such vertical positioning possible. This aspect is important in the sense that as an outset no liquid will flow into the chamber. The wet gas which runs along and meet cables inside the motor housing will, due to the high pressures involved meet the cables at the inside or high pressure side of the chamber 25'. This will, however, be a high pressure "dead end" chamber part with little or no circulation of wet gas.

The filter 28 of e.g. ceramic pellets act as filter against any electrically conductive particles carried along with the wet gas and will also function as a flame arrester in case an explosion should occur in the motor.

In order to avoid decompression explosion of organic materials which are normally exposed to high pressure conditions, such as e.g. O-rings, washers and electrical insulating materials, the use of organic materials should be avoided to the extent possible. Thus, it would be preferable to limit the use of organic materials just to cable insulation materials. All other materials connected to high voltage carrying parts of the penetrators and the penetrator unit as such are suitably made from one or more of glass materials, ceramic materials and glass-ceramic materials. Further, silicone type materials may be used for insulation purposes.

Since a connection between a penetrator, e.g. penetrator 17 and a cable, e.g. cable 2" is an "open" structure, i.e. only secured by ceramic deflectors and a long electrical creep current distances, it is important that liquid is prevented from coming into contact any electrically conductive part in this region of the penetrator assembly.

In case the motor 4 and its housing 4" through operational failure is filled with liquid, such as sea water and/or gas condensate, at sea bed level, and the motor is started, the prevailing pressure will force the liquid to flow to the top of the motor. Fluid in the form of gas inside the chamber will consequently be compressed by the liquid level rising in the chamber 25'. Preferably, the volume of the chamber 25' is approximately ten times a volume needed to keep the penetrators 17-22 dry. Thus, the pressure 29 inside the chamber 25' may rise by a factor of 10 before the liquid level reaches a state of equilibrium with the compressed gas inside the chamber.

However, should the liquid level rise to a potential critical value, the sensors 24''' and 24'''' will react, thus causing an alarm to initiate that operations are halted until a more normal pressure situation is present.

The sensors 24', 24''' and 24'''' may suitably be of a capacitive type, although other sensor types to measure pressure, liquid level and liquid properties may be visualized. The temperature sensor 24" is suitably of a conventional type.

The sensor unit is important to detect excessive temperatures which could cause thermal breakthrough, or if the liquid level inside the chamber 25' rises to a level above an operational critical level.

Figure 4:
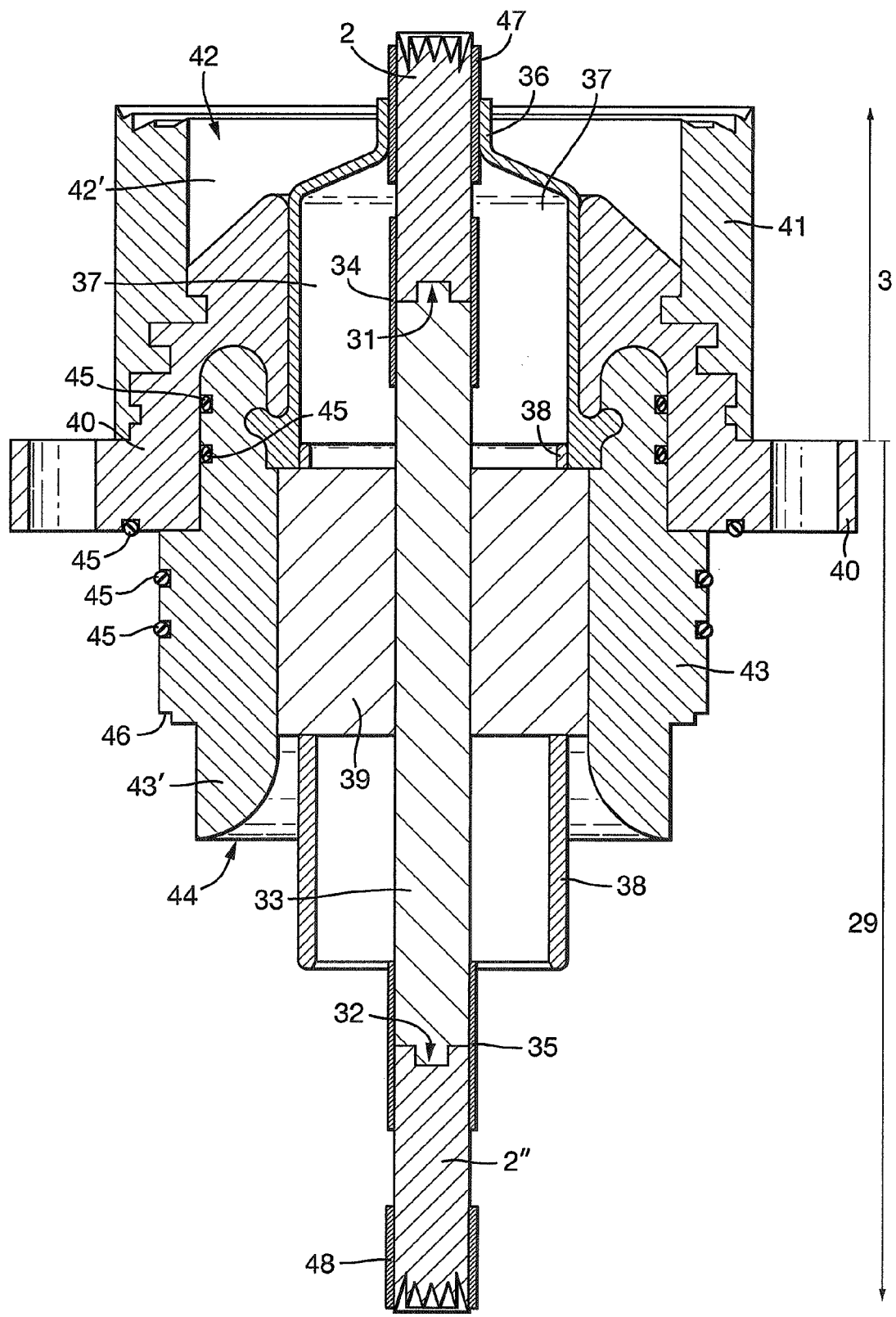
FIG. 4 is a typical penetrator structure according to the invention.

It should be pointed out that the penetrators could have a configuration as generally outlined on FIG. 2, or a configuration as shown in more detail on FIG. 4.

In view of the fact that the compressor unit with its penetrator unit is to be placed on a seabed at a substantial sea depth, e.g. at 250 meters, it is appreciated that the pressure at such depth is at 25 bar.

The motor 4 of the compressor unit 4, 5, 6 may e.g. have a test pressure of 440 bar, although its operational pressure would normally be a maximum of e.g. 220 bar. It is important to note that the gas delivered from the compressor 5 will circulate about the windings of the motor at the outlet pressure from the compressor 5.

Prior to lowering the compressor unit onto the seabed, it would be preferable to fill the motor with a gas having a pressure in excess of the outside pressure at the bottom of the sea, in this example e.g. a pressure of 30 bar, which will be the start pressure inside the chamber 25' also.

The references 3 and 29 on FIG. 4 point to and define what parts of the penetrator are exposed to the surrounding sea environment 3 and what parts are exposed to the environment inside the housing 25, respectively.

In a possible modification, it could be considered having heating elements inside the chamber for drying the gas or causing wet gas inside the chamber to condensate or for causing the wet gas to leave the chamber.

As indicated above, in order to accomplish a safe operation of the assembly, it is important that each high voltage penetrator 17-22 in the penetrator unit 16 is able to handle the operational electrical values in practice, as well as the temperature and pressure conditions. A typical, though not limitative example embodiment of a high voltage penetrator is shown on FIG. 4. The penetrator comprises a cable inlet terminal 31 and a cable outlet terminal 32, a conductive pin 33 at either end forming and extending between the terminals 31 and 32 and engageable at said either end with an inlet cable 2 and an outlet cable 2", respectively in a close engaging fit. A ceramic sleeve 34, 35 surrounds the respective terminals 31, 32 and an adjacent part of the conductive pin 33 and the cable 2; 2" thereat. Insulating means are provided to surround at least a substantial length of the conductive pin 33. The insulating means may suitably comprise a bootseal housing 36 with silicone oil or gel 37 therein encompassing the inlet terminal 31; a ceramic deflector 38, and an insulator pressure barrier 39 of glass, ceramic or glass-ceramic material. Further, there is a penetrator attachment sleeve 40 in engagement with the bootseal housing 36. A cable gland device is 41 installed on the sleeve 40 and extends towards the cable inlet side of the penetrator. The cable gland device 41 provides an internal space 42' adjacent an inlet side of the bootseal housing 36, said internal space being filled with a silicone oil or gel 42'. A metal body 43 is in engagement with the penetrator attachment sleeve 40, said bootseal housing 36 and the pressure barrier 39, the metal body 43 surrounding at least a part of said ceramic deflector 38 and said insulator pressure barrier 39.

The metal body is suitably made from titanium, e.g. titanium group 5. However, other suitable materials with similar operational properties to titanium when operating under the prevailing operating conditions, may be used instead. Further, in order to obtain maximum electric current creep distance, at least a part of the metal body is covered on an inside face with glass or ceramic or glass-ceramic material 44, said material engaging at least a part of the ceramic deflector 38 and the metal body 43 having a flared configuration part 43' facing the outlet terminal 32 of the penetrator.

The invention claimed is:

1. A high pressure, high voltage penetrator assembly for subsea use, wherein the assembly is upright attachable to a wet gas, subsea gas compressor, and wherein the assembly comprises:
   a penetrator unit for feed-through of electric power to a compressor motor;
   a funnel shaped housing with a housing chamber, the penetrator unit being located at an upper end of the chamber;
   a grid located inside the chamber transversely of a longitudinal axis of the chamber, the penetrator unit being located above the grid,
   a filter located in the chamber below the grid and above an inlet to a housing of the compressor motor, and
   a sensor unit extending into the chamber from the penetrator unit and towards, but spaced from the grid.

2. The penetrator assembly according to claim 1, wherein the grid has a mid-region thereof which is non-penetratable to liquid or gas.

3. The penetrator assembly according to claim 1, wherein electric cables extend from an installation on the sea surface down to the penetrator and are attached thereat to lead-through pins in the penetrator unit, the pins extending into the chamber and thereat are connected to electric cables for delivering power to the compressor motor, and wherein the cables inside the chamber extend from the penetrator unit through the grid and the filter and into the motor housing to be connected to electric terminals on the compressor motor.

4. The penetrator assembly according claim 1, wherein the filter is composed of a volume of ceramic pellets, beads, tubes or spheres.

5. The penetrator assembly according to claim 1, wherein the sensor unit is configured to operate in cooperation with signal processing means external of the assembly, the sensor unit having means for monitoring properties of an environment inside the housing, said means being at least one of: a pressure sensor, a temperature sensor, a liquid gas level sensor, and a sensor for sensing type or types of liquid inside the chamber.

6. The penetrator assembly according to claim 5, wherein the sensor unit comprises all four types of sensors located on a common carrier device which extends into a space between the penetrator unit and the grid.

7. A high voltage penetrator for use in a penetrator unit of a penetrator assembly according to claim 1, wherein the penetrator comprises:
   a cable inlet terminal and a cable outlet terminal, a conductive pin at either end forming and extending between the terminals and engageable at said either end with an inlet cable and an outlet cable, respectively in a close engaging fit,
   a ceramic sleeve surrounding the terminals and an adjacent part of the conductive pin and the cable thereat,
   insulating means which surround at least a substantial length of the conductive pin, wherein said insulating means comprise:
      a bootseal housing with silicone oil or gel therein encompassing the inlet terminal,
      a ceramic deflector, and
      an insulator pressure barrier of glass, ceramic or glass-ceramic material,
   a penetrator attachment sleeve in engagement with the bootseal housing,
   a cable gland device installed on the penetrator attachment sleeve and extending towards the inlet side of the penetrator, the cable gland device providing an internal space adjacent an inlet side of the bootseal housing, said internal space being filled with a silicone oil or gel, and
   a metal body in engagement with the penetrator attachment sleeve, said bootseal housing and the pressure barrier, the metal body surrounding at least a part of said ceramic deflector and said insulator pressure barrier.

8. The high voltage penetrator according to claim 7, wherein said metal body is made from titanium.

9. The high voltage penetrator according to claim 7, wherein at least a part of the metal body is provided on an inside face with glass or ceramic or glass-ceramic material, said material engaging at least a part of the ceramic deflector and said metal body having a flared configuration part facing the outlet terminal of the penetrator.

* * * * *